(12) United States Patent
Lee et al.

(10) Patent No.: US 10,033,546 B2
(45) Date of Patent: Jul. 24, 2018

(54) METHOD AND SYSTEM FOR REPROGRAMMING

(71) Applicant: Hyundai Motor Company, Seoul (KR)

(72) Inventors: So Jin Lee, Seoul (KR); Hyun Cheol Bae, Suwon-si (KR); Kang Ju Cha, Seoul (KR); Chung Hi Lee, Seoul (KR); Ji Hwon Kim, Gwangmyeong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 965 days.

(21) Appl. No.: 13/909,689

(22) Filed: Jun. 4, 2013

(65) Prior Publication Data

US 2014/0188253 A1    Jul. 3, 2014

(30) Foreign Application Priority Data

Dec. 31, 2012    (KR) .................. 10-2012-0158395

(51) Int. Cl.
*H04L 12/40*    (2006.01)
*G06F 11/07*    (2006.01)
(Continued)

(52) U.S. Cl.
CPC .......... *H04L 12/4013* (2013.01); *G05B 15/02* (2013.01); *G05B 19/0421* (2013.01);
(Continued)

(58) Field of Classification Search
CPC .... G06F 8/65; G06F 11/0739; G06F 11/0793; G06F 11/3003; G11C 16/102;
(Continued)

(56) References Cited

U.S. PATENT DOCUMENTS 7,139,653 B2 *  11/2006  Ringger ................. F16H 59/02
                                                            701/51
8,019,487 B2 *   9/2011  Goto ......................... G06F 8/64
                                                             701/1
(Continued)

FOREIGN PATENT DOCUMENTS

CN       101953161 A      1/2011
EP       1128242 A2       8/2001
(Continued)

OTHER PUBLICATIONS

Office Action issued in corresponding Chinese Patent Application No. 2013-102504450, dated Jun. 15, 2017 with English Translation.

*Primary Examiner* — Crystal J Barnes-Bullock
(74) *Attorney, Agent, or Firm* — McDermott Will & Emery LLP

(57) ABSTRACT

The system for reprogramming a plurality of control units includes a first control unit and a second control unit connected by one CAN bus, and a diagnosing unit. The diagnosing unit includes a first controller configured to reprogram the first control unit and a second controller configured to reprogram the second control unit. The diagnosing unit is configured to perform bidirectional reprogramming for the first control unit and the second control unit while sharing information between the first controller and the second controller.

9 Claims, 5 Drawing Sheets

(51) Int. Cl.

| | | |
|---|---|---|
| *G05B 15/02* | (2006.01) | |
| *G06F 11/30* | (2006.01) | |
| *G06F 8/65* | (2018.01) | |
| *G11C 16/10* | (2006.01) | |
| *H04L 12/417* | (2006.01) | |
| *H04M 1/725* | (2006.01) | |
| *H04L 29/08* | (2006.01) | |
| *H04L 29/06* | (2006.01) | |
| *G05B 19/042* | (2006.01) | |

(52) U.S. Cl.
CPC ............ *G06F 8/65* (2013.01); *G06F 11/0739* (2013.01); *G06F 11/0793* (2013.01); *G06F 11/3003* (2013.01); *G11C 16/102* (2013.01); *H04L 12/40013* (2013.01); *H04L 12/417* (2013.01); *H04L 63/00* (2013.01); *H04L 67/12* (2013.01); *H04M 1/72525* (2013.01); *B60K 2350/355* (2013.01); *G05B 2219/23295* (2013.01); *H04L 2012/40215* (2013.01); *H04L 2012/40273* (2013.01)

(58) Field of Classification Search
CPC ............ B60K 2350/355; H04L 12/417; H04L 12/4013; H04L 12/40013; H04L 2012/40215; H04L 2012/40273; H04L 63/00; H04L 67/12; H04M 1/72525
See application file for complete search history.

(56) References Cited

U.S. PATENT DOCUMENTS

| | | | |
|---|---|---|---|
| 8,762,982 B1* | 6/2014 | Goslee | B60K 37/02 701/29.1 |
| 9,043,078 B2* | 5/2015 | Johnson | G07C 5/008 701/32.7 |
| 9,209,942 B2* | 12/2015 | Takada | H04L 12/407 |
| 9,225,544 B2* | 12/2015 | Mabuchi | H04L 12/4035 |
| 9,298,577 B2* | 3/2016 | Mabuchi | H04L 12/4135 |
| 9,529,776 B2* | 12/2016 | Yasuda | G07C 5/008 |
| 2002/0120856 A1 | 8/2002 | Schmidt et al. | |
| 2004/0210891 A1 | 10/2004 | Kouznetsov et al. | |
| 2005/0144430 A1 | 6/2005 | Yamamoto et al. | |
| 2007/0036021 A1* | 2/2007 | Nakagaki | G11C 16/10 365/230.03 |
| 2007/0185624 A1* | 8/2007 | Duddles | G06F 8/665 701/1 |
| 2009/0319756 A1* | 12/2009 | Shimizu | G06F 8/67 712/30 |
| 2010/0031162 A1* | 2/2010 | Wiser | G06Q 30/0255 715/747 |
| 2010/0325666 A1 | 12/2010 | Wiser et al. | |
| 2011/0022752 A1* | 1/2011 | Schreier | H04L 12/40013 710/105 |
| 2012/0167071 A1* | 6/2012 | Paek | G06F 8/65 717/170 |

FOREIGN PATENT DOCUMENTS

| | | |
|---|---|---|
| JP | 2007525059 A | 8/2007 |
| JP | 2010-003081 A | 1/2010 |
| KR | 10-0299127 | 9/2001 |
| KR | 10-2004-0091925 A | 11/2004 |
| KR | 10-2005-0065431 A | 6/2005 |
| KR | 10-2006-0134446 A | 12/2006 |
| KR | 10-2011-0016139 A | 2/2011 |
| KR | 10-2011-0039066 A | 4/2011 |
| KR | 10-2011-0076432 A | 7/2011 |

* cited by examiner

|  | Byte1 | | Byte2 | Byte3 | Byte4-Byte7 | Byte8 |
|---|---|---|---|---|---|---|
|  | High nibble | Low nibble | | | | |
| First Frame | 0001 | FF_DL | | DATA1 | ... | DATA6 |
| Consecutive Frame | 0010 | SN | DATA1 | DATA2 | ... | DATA7 |
| Flow Control | 0011 | FS | BS | STmin | N/A | |

Fig.4

METHOD AND SYSTEM FOR REPROGRAMMING

CROSS-REFERENCE TO RELATED APPLICATION

This application is based on and claims benefit of priority to Korean Patent Application No. 10-2012-0158395, filed on Dec. 31, 2012 in the Korean Intellectual Property Office, the entire contents of which are hereby incorporated by reference.

TECHNICAL FIELD

The present inventive concept relates to a method and a system for reprogramming which perform bidirectional reprogramming for a plurality of control units.

BACKGROUND

A large number of control units are mounted in vehicles. The control units are supposed to perform reprogramming with new version programs.

In general, reprogramming transmits/receives data through a Controller Area Network (CAN) bus and reprograms one control unit at a time. When the size of reprogram data is large, for example, when reprogram data is over 7 Bytes, the reprogram data may be transmitted to a corresponding control unit by a multi-frame transmission method and data of up to 0xFFF may be transmitted at a time.

Since the work of reprogramming reprograms one control unit at a time, there is a problem in that it takes long time and high cost to reprogram all the control units.

SUMMARY

Accordingly, the present inventive concept has been made to solve the above-mentioned problems occurring in the prior art while advantages achieved by the prior art are maintained intact.

One aspect of the present inventive concept relates to a method and a system for reprogramming which perform bidirectional reprogramming on a plurality of control units.

Another aspect of the present inventive concept encompasses a method and a system for reprogramming which reduce the time taken to reprogram another control unit, using a period with a low data transmission rate, when reprogramming a control unit connected to one CAN bus.

An aspect of the present inventive concept relates to a method for reprogramming a plurality of control units using a diagnosing unit including a first controller and a second controller. According to the method, information on a first control unit is received by operating the first controller in a first control transmission mode for the first control unit. When the first control transmission mode is finished, multi-reprogramming data is transmitted to the first control unit on the basis of the information on the first control unit received in the first control transmission mode by operating the first controller in a first data transmission mode for the first control unit. Information on the second control unit is received by operating the second controller in a second control transmission mode for the second control unit while the first controller operates in the first data transmission mode. When the first controller finishes the first data transmission mode for the first control unit, multi-reprogramming data is transmitted to the second control unit on the basis of the information second control unit received in the second control transmission mode by operating the second controller in a second data transmission mode for the second control unit.

The method may further include operating in a standby mode for the second control unit until the first controller finishes operating in the first data transmission mode for the first control unit, when the first controller is in operation in the first data transmission mode, even though the second controller finishes the second control transmission mode after the receiving of the information on the second control unit.

In the receiving of the information on the first control, the first controller may transmit a first frame to the first control unit and receive a flow control frame from the first control unit in response to the transmitted first frame.

In the operating in the second control transmission mode, the second controller may transmit a first frame to the second control unit and receive a flow control frame from the second control unit in response to the first frame.

The first frame may include the information on a first frame data length that may be the entire length of the data to be transmitted to the first control unit by a multi-frame transmission method and the flow control frame may include the information on the flow status, the maximum block size through which a consecutive frame may be received without a flow control frame in the middle of the process, and the minimum separation time between consecutive frames of the first control unit.

The first frame may include the information on a first frame data length that may be the entire length of the data to be transmitted to the second control unit by a multi-frame transmission method and the flow control frame may include the information on the flow status, the maximum block size through which a consecutive frame may be received without a flow control frame in the middle of the process, and the minimum separation time between consecutive frames of the second control unit.

In the transmitting of the multi-reprogram data, consecutive frames including sequence numbers of divided reprogramming data and corresponding reprogramming data may be consecutively transmitted.

The method may further include receiving a flow control requesting the first control unit or the second control unit to transmit a next multi-frame, by means of the first controller or the second controller after the transmitting of multi-reprogramming data.

A further aspect of the present inventive concept relates to a system for reprogramming a plurality of control units connected by one CAN bus. The system includes a first control unit and a second control unit connected by the one CAN bus, and a diagnosing unit. The diagnosing unit includes a first controller configured to reprogram the first control unit and a second controller configured to reprogram the second control unit. The diagnosing unit is configured to perform bidirectional reprogramming for the first control unit and the second control unit while sharing information between the first controller and the second controller.

BRIEF DESCRIPTION OF THE DRAWINGS

The foregoing and other features of the inventive concept will be apparent from a more particular description of embodiments of the inventive concept, as illustrated in the accompanying drawings in which like reference characters may refer to the same or similar parts throughout the different views. The drawings are not necessarily to scale.

FIG. 4 is an exemplary diagram illustrating a reprogramming data structure according to an exemplary embodiment of the present inventive concept.

DETAILED DESCRIPTION

Hereinafter, exemplary embodiments of the present inventive concept will be described with reference to the accompanying drawings.

Figure 1:
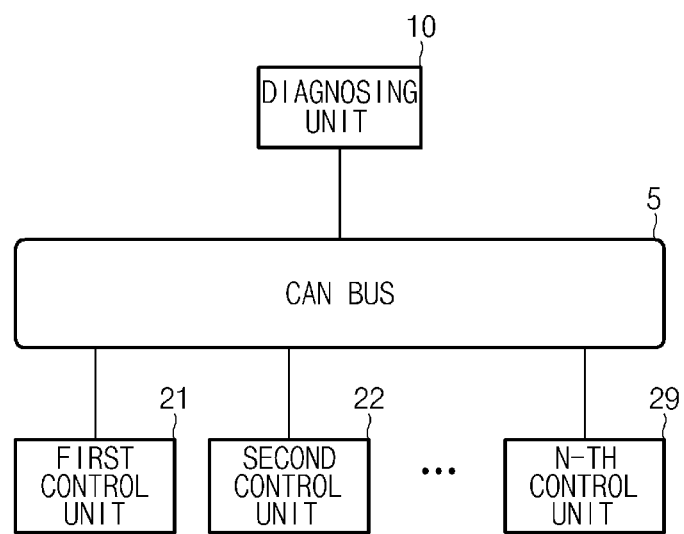
FIG. 1 is a diagram illustrating the structure of a system for reprogramming according to an exemplary embodiment of the present inventive concept.

FIG. 1 is a diagram illustrating the structure of a system for reprogramming according to an exemplary embodiment of the present inventive concept.

Referring to FIG. 1, a system for reprogramming according to an exemplary embodiment of the present inventive concept may include a plurality of control units, for example, a first control unit 21, a second control unit 22, . . . , and an N-th control unit 29, and a diagnosing unit 10 that reprograms the control units. The control units and the diagnosing unit 10 may be connected by one CAN bus 5 and transmit/receive data through CAN communication.

The diagnosing unit 10 may keep information on the control units connected by the CAN bus 5. The diagnosing unit 10 may diagnose the status of the control units and may sort and reprogram the control units that need to be reprogrammed.

Figure 2:
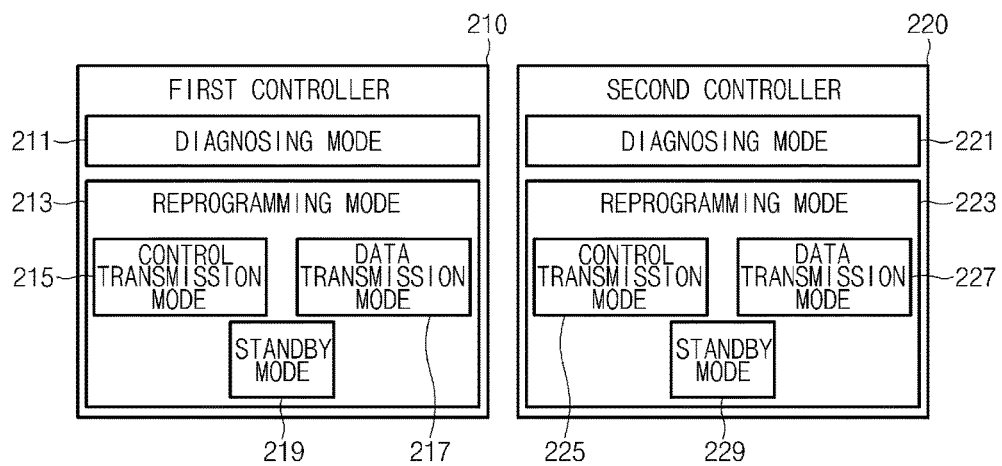
FIG. 2 is a diagram illustrating control modes for control units in a diagnosing unit of FIG. 1.

The diagnosing unit 10 may individually manage the statuses of the control units and control modes of the control units are shown in FIG. 2. As shown in FIG. 2, the diagnosing unit may control the control units in diagnosing modes 211 and 221 and reprogramming modes 213 and 223. In the following descriptions of exemplary embodiments, controlling of the diagnosing unit will be described in connection with the first control unit and the second control unit for the convenience of description.

The diagnosing unit 100 may include controllers for each of the control units and the controllers may control reprogramming on corresponding control units. For example, the diagnosing unit may include a first controller 210 for the first control unit and a second controller 220 for the second control unit. The first controller 210 and the second controller 220 may share information to reprogram the corresponding control units.

First, while operating in the diagnosing mode 211 for the first control unit, the first controller 210 diagnoses the status of the first control unit on the basis of the information transmitted from the first control unit. For example, the first controller 210 may check information on the program version of the first control unit. If, the program version of the first control unit is not the latest version, based on the information, the first controller 210 may convert the diagnosing mode 211 into the reprogramming mode 213 and reprogram the first controller 210.

Similarly, while operating in the diagnosing mode 221 for the second control unit, the second controller 220 diagnoses the status of the second control unit on the basis of the information transmitted from the second control unit. For example, the second controller 220 may check information on the program version of the second control unit, and when the program version of the second control unit is not the latest version, based on the information, the second controller 220 may convert the diagnosing mode 221 into the reprogramming mode 223 and reprogram the second control unit. The second controller 220 may operate in the reprogramming mode 223 for the second control unit even when the first controller 210 operates in the reprogramming mode 213 for the first control unit.

The reprogramming mode 213 for the first control unit may be divided into a control transmission mode 215, a data transmission mode 217, and a standby mode 2191, respectively. The reprogramming mode 223 for the second control unit may be divided into control transmission mode 225, data transmission mode 227, and standby mode 229, respectively. The control transmission modes 215 and 225 are for transmitting predetermined data relating to reprogramming to the control units before the diagnosing unit performs reprogramming, and receiving information including the communication status, the block size, and the minimum separation time from corresponding control units. The control transmission modes 215 and 225 may be performed even if a data transmission mode for another control unit is in operation.

The data transmission modes 217 and 227 are for transmitting reprogramming data to corresponding control units, in which the reprogramming data is transmitted in a type of multi-data of about maximum 0xFFF Bytes. The data transmission modes 217 and 227 may not be performed, when the data transmission modes 217 and 227 are in operation for another control unit. In this case, the data transmission modes 217 and 227 need to stand by until the data transmission modes 217 and 227 for another control unit are finished and the modes are converted into the standby modes 219 and 229.

Reprogramming the first control unit and the second control unit will be described in detail with reference to FIG. 3.

An operation flow in the system for reprogramming having the configuration according to an exemplary embodiment of the present inventive concept will be described hereafter in more detail.

Figure 3:
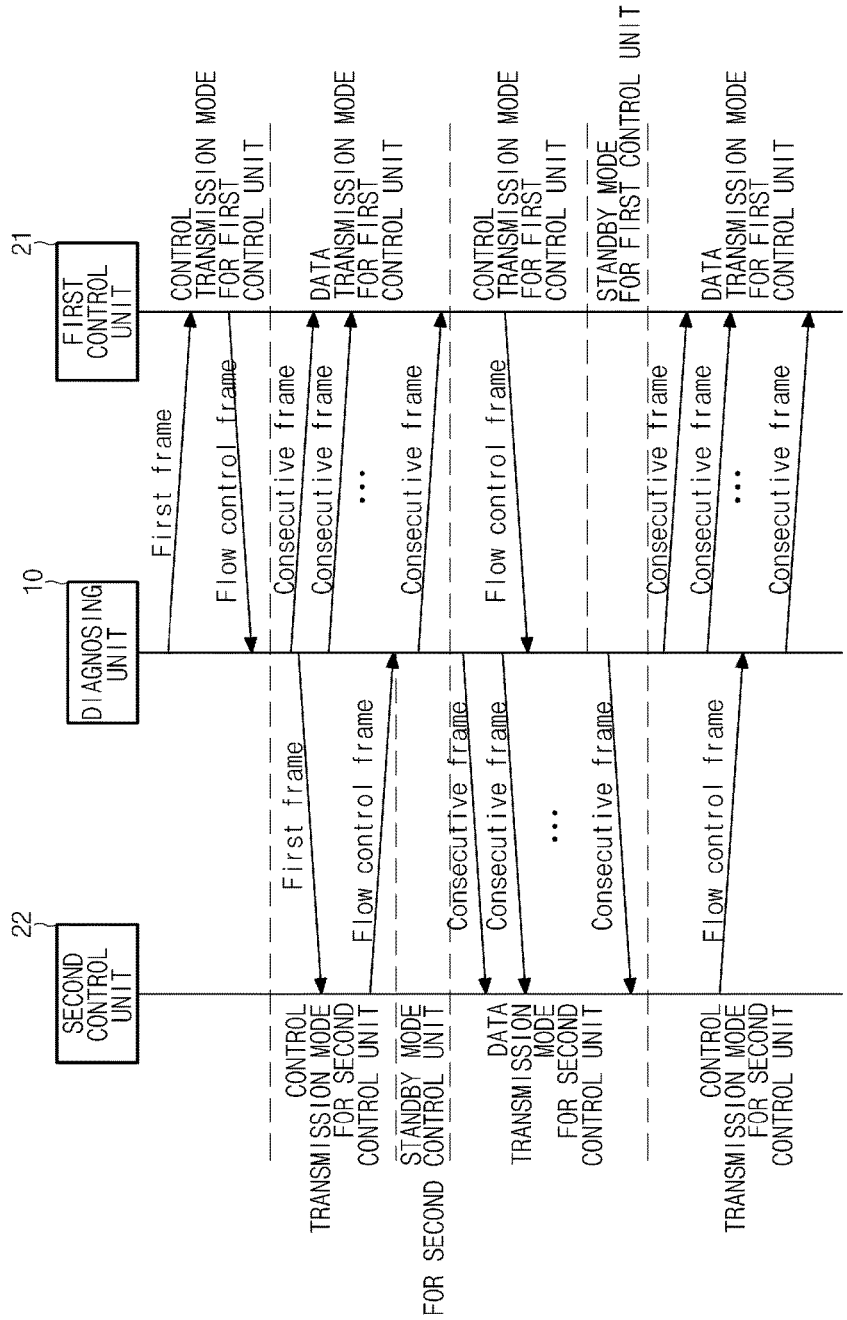
FIG. 3 is a flowchart illustrating an operation flow of a method for reprogramming according to an exemplary embodiment of the present inventive concept.

FIG. 3 is a flowchart illustrating the operation flow of a method for reprogramming according to an exemplary embodiment of the present inventive concept. As shown in FIG. 3, the diagnosing unit 10, e.g., the first controller 210, may first transmit a first frame to the first control unit 21 in order to reprogram the first control unit 21. The first frame may include information on a first frame data length that is the entire length of the data to be transmitted to the first control unit 21 by a multi-frame transmission method. Thereafter, the first control unit 21 may transmit a flow control frame to the diagnosing unit 10, e.g., the first controller 210, in response to the first frame from the diagnosing unit 10. The flow control frame may includes information on the flow status of the control unit, the maximum block size through which a consecutive frame may be received without a flow control frame in the middle of the process, and the minimum separation time between consecutive frames.

Therefore, the diagnosing unit 10 may check the status of the first control unit 21 from the flow control frame received from the first control unit 21, and divide the reprogramming data into multi-data on the basis of the status and then transmit the multi-data to the first control unit 21. Since the diagnosing unit 10 does not reprogram another control unit, for example, the second control unit 22 in this process; the diagnosing unit 10 may convert the mode to the data transmission mode and transmit reprogramming data to the first control unit 21. The reprogramming data divided into a plurality of items of data may be transmitted with consecutive frames. The consecutive frames may include the divided reprogramming data and sequence numbers of corresponding ones of the divided reprogramming data.

While operating in the data transmission mode for the first control unit 21, the diagnosing unit 10 may operate in the control transmission mode for the second control unit 22.

That is, since the data in the first frame or the flow control frame is small in size, it may not have a large influence on the communication through the CAN bus 5. Therefore, while transmitting the reprogramming data to the first control unit 21, it is possible, e.g., for the second controller 220, to convert the mode to the control transmission mode for the second control unit 22, to transmit a first frame to the second control unit 22, and to receive a flow control frame from the second control unit 22.

In this case, since the diagnosing unit 10 has been operating in the data transmission mode for the first control unit 21, when the control transmission mode for the second control unit 22 is finished, the mode may be converted into the standby mode for the second control unit 22 until the data transmission mode for the first control unit 21 is finished.

If transmission of a portion of the reprogramming data to the first control unit 21 completes and the flow control frame is received from the first control unit 21, the diagnosing unit 10 may finish the data transmission mode for the first control unit 21 and convert the mode to the control transmission mode. The flow control frame received from the first control unit 21 may have the same type as a type of the flow control frame received before from the second control unit 22. The diagnosing unit 10 may convert the standby mode into the data transmission mode for the second control unit and transmit the reprogramming data, when the data transmission mode for the first control unit 21 is finished. Obviously, while the reprogramming data is transmitted to the second control unit 22, the diagnosing unit 10 may transmit a first frame to the first control unit 21 or receive a flow control frame from the first control unit 21 by operating in the control transmission mode for the first control unit 21.

Similarly, since the diagnosing unit 10 has been operating in the data transmission mode for the second control unit 22, when the control transmission mode for the first control unit 21 is finished, the mode may be converted into the standby mode for the first control unit 21 until the data transmission mode for the second control unit 22 is finished.

The diagnosing unit 10 may perform bidirectional reprogramming for the first control unit 21 and the second control unit 22 by repeating the processes described above.

FIG. 4 is an exemplary diagram illustrating a reprogramming data structure according to an exemplary embodiment of the present inventive concept, which shows the data structures of a first frame, a consecutive frame, and a flow control frame. It is assumed that the frames each have a size of 8 Bytes.

First, the identification number '0001' of the first frame may be included in the high nibble (4 bits) of the first byte of the first frame. Information on the first frame data length, which is the entire length of data to be sent by a multi-frame transmission method, may be included in the low nibble (4 bits) of the first byte and the second byte. The entire length FF_DL (First frame data length) of the first frame may be 12 bits, so the data with a maximum size of 0xFFF may be transmitted by the multi-frame transmission method at a time. Further, predetermined data from the diagnosing unit 10 may be included in the third byte to the eight byte of the first frame.

The identification number '0010' of the consecutive frame may be included in the high nibble (4 bits) of the first byte of the consecutive frame and the sequence number SN of the consecutive frame may be included in the low nibble (4 bits) of the first byte. Further, reprogramming data from the diagnosing unit may be included in the second byte to the eight byte of the consecutive frame.

The identification number '0011' of a flow control frame may be included in the high nibble (4 bits) of the first byte of the flow control frame and information on the flow status FS of a control unit may be included in the low nibble (4 bits) of the first byte of the flow control frame. Further, information on the block size BS of the control unit may be included in the second byte of the flow control frame. The block size may depend on the number of consecutive frames in the protocol data unit of layer N (N_PDU) for each block. Further, information on the minimum separation time STmin may be included in the third byte of the flow control frame. Further, predetermined data from the diagnosing unit may be included in the fourth byte to the eight byte of the flow control frame.

Figure 5:
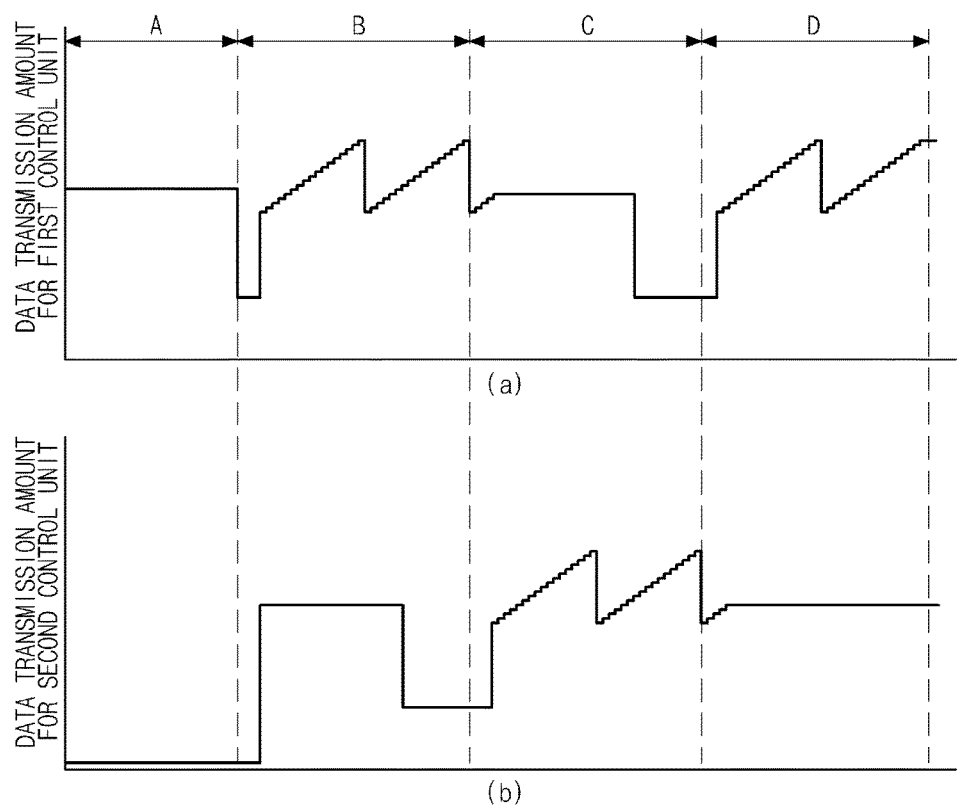
FIG. 5 is an exemplary diagram illustrating a transmission status of a reprogramming data structure according to an exemplary embodiment of the present inventive concept.

FIG. 5 is an exemplary diagram illustrating a transmission status of a reprogramming data structure according to an exemplary embodiment of the present inventive concept. As shown in FIG. 5, the diagnosing unit operates in the control transmission mode for the first control unit in the section A, while the diagnosing unit operates in the data transmission mode for the first control unit and in the control transmission mode for the second control unit in the section B. When the control transmission mode for the second control unit in the section B is finished, the diagnosing unit operates in the standby mode for the second control unit to the end of the section B.

On the other hand, as shown in FIG. 5, the diagnosing unit operates in the control transmission mode for the first control unit and in the data transmission mode for the second control unit in the section C. When the control transmission mode for the first control unit in the section C is finished, the diagnosing unit operates in the standby mode for the first control unit to the end of the section C.

In the section D, the diagnosing unit operates in the data transmission mode for the first control unit and in the control transmission mode for the second control unit.

As shown in FIG. 5, the diagnosing unit may perform bidirectional reprogramming for a plurality of control units connected by one CAN bus by performing a control transmission mode for another control unit while a data transmission mode for any one control unit is performed.

As set forth above, when reprogramming control units connected to on CAN bus, it is possible to reduce the time taken for reprogramming by reprogramming another control unit using a period with a low data transmission rate.

Further, it is possible to reduce the cost for reprogramming by reducing the time for reprogramming a plurality of control units.

Although the present inventive concept was described with reference to limited exemplary embodiments and drawings, the present inventive concept is not limited thereto and may be changed and modified in various ways within the spirit of the present inventive concept and claims described below by those skilled in the art.

What is claimed is:

1. A method of reprogramming a plurality of control units using a diagnosing unit including a first controller and a second controller operating in a reprogramming mode, the method comprising:
   receiving, by the diagnosing unit, information on a first control unit by operating the first controller in a first control transmission mode for the first control unit;
   when the first control transmission mode is finished, transmitting, by the diagnosing unit, multi-reprogramming data to the first control unit on the basis of the information on the first control unit by operating the first controller in a first data transmission mode for the first control unit, and requesting and receiving, by the diagnosing unit, information on a second control unit by operating the second controller in a second control transmission mode for the second control unit, wherein the first data transmission mode and the second control transmission mode operate simultaneously;
   when the first controller finishes the first data transmission mode for the first control unit, transmitting, by the diagnosing unit, multi-reprogramming data to the second control unit on the basis of the information on the second control unit by operating the second controller in a second data transmission mode for the second control unit; and
   performing, by the diagnosing unit, bidirectional reprogramming for the first control unit and the second control unit connected by one Controller Area Network (CAN) bus,
   wherein the information on the second control unit includes information for reprogramming of the second control unit,
   wherein the second control transmission mode is operated in period with a data transmission rate which is lower than a data transmission rate for transferring the multi-reprogramming data, and
   wherein the reprogramming mode includes a control transmission mode, a data transmission mode and a standby mode.

2. The method according to claim 1, further comprising:
   operating in the standby mode for the second control unit until the first controller finishes operating in the first data transmission mode for the first control unit, when the first controller is in operation in the first data transmission mode, even if the second controller finishes the second control transmission mode after the receiving of the information on the second control unit.

3. The method according to claim 1, wherein the receiving of the information on the first control unit includes:
   transmitting, by the first controller, a first frame to the first control unit; and
   receiving, by the first controller, a flow control frame from the first control unit in response to the transmitted first frame.

4. The method according to claim 1, wherein the receiving of the information on the second control unit includes:
   transmitting, by the second controller, a first frame to the second control unit; and
   receiving, by the second controller, a flow control frame from the second control unit in response to the first frame.

5. The method according to claim 3, wherein:
   the first frame includes information on reprogramming, and
   the flow control frame includes information on at least one of a flow status, a block size, and the minimum separation time of the first control unit.

6. The method according to claim 4, wherein:
   the first frame includes information on reprogramming, and
   the flow control frame includes information on at least one of a flow status, a block size, and the minimum separation time of the second control unit.

7. The method according to claim 1, wherein the transmitting of multi-reprogram data includes: consecutively transmitting consecutive frames that includes sequence numbers of divided reprogramming data and corresponding reprogramming data.

8. The method according to claim 1, further comprising:
   receiving a flow control frame from the first control unit or the second control unit to transmit a next multi-frame, by the first controller or the second controller, after the transmitting of multi-reprogramming data.

9. A system for reprogramming a plurality of control units connected by one Controller Area Network (CAN) bus, comprising:
   a first control unit and a second control unit connected by the one CAN bus; and
   a diagnosing unit including a first controller configured to reprogram the first control unit and a second controller configured to reprogram the second control unit, in a reprogramming mode,
   wherein the diagnosing unit is configured to perform bidirectional reprogramming for the first control unit and the second control unit by sharing an operating mode information of the first control unit and the second control unit between the first controller and the second controller,
   wherein when the first control transmission mode is finished, the diagnosing unit transmits multi-reprogramming data to the first control unit on the basis of the information on the first control unit by operating the first controller in a first data transmission mode for the first control unit, and requests and receives information on the second control unit by operating the second controller in a second control transmission mode for the second control unit,
   wherein the first data transmission mode and the second control transmission mode operate simultaneously,
   wherein the second control transmission mode is operated in period with a data transmission rate which is lower than a data transmission rate for transferring the multi-reprogramming data, and
   wherein the reprogramming mode includes a control transmission mode, a data transmission mode and a standby mode.

* * * * *